United States Patent
Kurakane

(10) Patent No.: US 10,936,855 B2
(45) Date of Patent: Mar. 2, 2021

(54) DISPLAY DEVICE FOR DISPLAYING IN ONE SCREEN A FIGURE OF A USER SEEN FROM MULTIPLE DIFFERENT DIRECTIONS, AND DISPLAY METHOD AND RECORDING MEDIUM FOR THE SAME

(71) Applicant: NEC Corporation, Tokyo (JP)

(72) Inventor: Hiroshi Kurakane, Tokyo (JP)

(73) Assignee: NEC CORPORATION, Tokyo (JP)

( * ) Notice: Subject to any disclaimer, the term of this patent is extended or adjusted under 35 U.S.C. 154(b) by 217 days.

(21) Appl. No.: 14/778,152

(22) PCT Filed: Mar. 12, 2014

(86) PCT No.: PCT/JP2014/056535
§ 371 (c)(1),
(2) Date: Sep. 18, 2015

(87) PCT Pub. No.: WO2014/156661
PCT Pub. Date: Oct. 2, 2014

(65) Prior Publication Data
US 2016/0283781 A1 Sep. 29, 2016

(30) Foreign Application Priority Data
Mar. 27, 2013 (JP) .............................. JP2013-066752

(51) Int. Cl.
*G06K 9/00* (2006.01)
*H04N 7/18* (2006.01)
(Continued)

(52) U.S. Cl.
CPC ..... *G06K 9/00288* (2013.01); *G06K 9/00255* (2013.01); *G06K 9/00268* (2013.01);
(Continued)

(58) Field of Classification Search
CPC ........... G06K 9/00255; G06K 9/00268; G06K 9/00288; G09G 2354/00; G09G 2356/00;
(Continued)

(56) References Cited

U.S. PATENT DOCUMENTS

2009/0060490 A1  3/2009 Kuwahara et al.
2011/0210970 A1  9/2011 Segawa
(Continued)

FOREIGN PATENT DOCUMENTS

CN         103098461 A    5/2013
EP          2039405 A2    3/2009
(Continued)

OTHER PUBLICATIONS

Chan, How to take Tasty Mirror Photos with Marc Huelet, Jan. 17, 2012, https://www.youtube.com/watch?v=4YRvdodv_Ng.*

(Continued)

*Primary Examiner* — Francis Geroleo

(57) ABSTRACT

A display device includes: first and second cases that are connected to each other so as to be capable of moving relatively; a first image-capture unit that is provided in the first case and images a first image; a second image-capture unit that is provided in the second case and images a second image; a first display unit that is provided in the first case; a second display unit that is provided in the second case; a face recognition unit that determines whether the first image and the second image include a face seen from front; and a display control unit that causes the first display unit to display the first image and the second image when the face recognition unit determines that the first image includes a face seen from front, the display control unit causing the second display unit to display the first image and the second image when the face recognition unit determines that the second image includes a face seen from front.

4 Claims, 7 Drawing Sheets

(51) Int. Cl.
  *H04N 5/225* (2006.01)
  *H04N 5/262* (2006.01)
  *H04N 5/232* (2006.01)
  *H04N 5/64* (2006.01)
  *H04N 5/645* (2006.01)
  *H04N 5/247* (2006.01)

(52) U.S. Cl.
  CPC ......... *H04N 5/2251* (2013.01); *H04N 5/2258* (2013.01); *H04N 5/23218* (2018.08); *H04N 5/23293* (2013.01); *H04N 5/247* (2013.01); *H04N 5/2621* (2013.01); *H04N 5/64* (2013.01); *H04N 5/645* (2013.01); *H04N 7/18* (2013.01); *G09G 2354/00* (2013.01); *G09G 2356/00* (2013.01); *H04N 5/2624* (2013.01)

(58) Field of Classification Search
  CPC ............... H04N 5/2251; H04N 5/2258; H04N 5/23293; H04N 5/247; H04N 5/2621; H04N 5/2624; H04N 5/64; H04N 5/645; H04N 7/18
  USPC .......................................................... 348/77
  See application file for complete search history.

(56) References Cited

U.S. PATENT DOCUMENTS

| | | | |
|---|---|---|---|
| 2011/0298826 A1* | 12/2011 | Namba | G06F 1/1616 345/635 |
| 2012/0075166 A1* | 3/2012 | Marti | G06F 3/011 345/1.1 |
| 2012/0129581 A1* | 5/2012 | Choi | H04M 1/0218 455/575.3 |
| 2012/0182210 A1* | 7/2012 | Chan | G06F 3/1423 345/156 |
| 2012/0229616 A1 | 9/2012 | Koike et al. | |
| 2012/0242599 A1 | 9/2012 | Seo et al. | |
| 2012/0249601 A1* | 10/2012 | Kawashimo | G09G 3/20 345/681 |
| 2014/0098188 A1* | 4/2014 | Kwak | H04N 5/23238 348/38 |
| 2014/0210705 A1* | 7/2014 | Kim | G06F 3/0485 345/156 |
| 2014/0282059 A1* | 9/2014 | Oh | G06F 1/1641 715/744 |

FOREIGN PATENT DOCUMENTS

| | | |
|---|---|---|
| JP | 63-231431 A | 9/1988 |
| JP | H11-112970 A | 4/1999 |
| JP | 2001-025004 A | 1/2001 |
| JP | 2008-111886 A | 5/2008 |
| JP | 2010-087569 A | 4/2010 |
| WO | 2012/124612 A1 | 9/2012 |

OTHER PUBLICATIONS

Extended European Search Report for EP Application No. EP14773758.9 dated Jul. 29, 2016.

International Search Report for PCT Application No. PCT/JP2014/056535, dated Jun. 3, 2014.

Chinese Office Action for CN Application No. 201480016456.5 dated Nov. 17, 2017 with English Translation.

* cited by examiner

DISPLAY DEVICE FOR DISPLAYING IN ONE SCREEN A FIGURE OF A USER SEEN FROM MULTIPLE DIFFERENT DIRECTIONS, AND DISPLAY METHOD AND RECORDING MEDIUM FOR THE SAME

This application is a National Stage Entry of PCT/JP2014/056535 filed on Mar. 12, 2014, which claims priority from Japanese Patent Application 2013-066752 filed on Mar. 27, 2013, the contents of all of which are incorporated herein by reference, in their entirety.

TECHNICAL FIELD

The present invention relates to a display device, a display method, and a display program.

BACKGROUND ART

There is, for example, a device that images the figure of both sides of a user using two image-capture units, and displays on a display unit an image that is a combination of the two side images that have been captured (for example, refer to Patent Document 1).

There also exists a device that images the figure seen from the front and the figure seen from the rear of a user by two image-capture units. This device for example displays the figure seen from the front on a display unit and displays to the user by reflection in a mirror an image expressing the figure seen from the side (for example, refer to Patent Document 2).

PRIOR ART DOCUMENTS

Patent Document

[Patent Document 1] Japanese Unexamined Patent Application, First Publication No. 2010-87569
[Patent Document 2] PCT International Publication No. WO 2012/124612

SUMMARY OF THE INVENTION

Problem to be Solved by the Invention

However, in the device disclosed in Patent Document 1, cameras must be installed corresponding to the standing position of the user, leading to the constitution of the entire device becoming large in scale. For this reason, there is the problem of not being able to apply this kind of art to tablet terminals, mobile terminals and the like.

In the device disclosed in Patent Document 2, the display unit displays differing first and second images showing the user. The second image that is displayed by the display unit is reflected in a mirror. In this way, since a mirror is required, the constitution of the entire device becomes large in scale. For that reason, there is the problem of not being able to apply this kind of art to tablet terminals, mobile terminals and the like.

The present invention has been achieved in view of the above circumstances. An exemplary object of the present invention is to provide a display device, a display method, and a display program capable of solving the aforementioned issues.

Means for Solving the Problem

A display device according to an exemplary aspect of the present invention includes: first and second cases that are connected to each other so as to be capable of moving relatively; a first image-capture unit that is provided in the first case and images a first image; a second image-capture unit that is provided in the second case and images a second image; a first display unit that is provided in the first case; a second display unit that is provided in the second case; a face recognition unit that determines whether the first image and the second image include a face seen from front; and a display control unit that causes the first display unit to display the first image and the second image when the face recognition unit determines that the first image includes a face seen from front, the display control unit causing the second display unit to display the first image and the second image when the face recognition unit determines that the second image includes a face seen from front.

A display method according to an exemplary aspect of the present invention is used for a display device including first and second cases that are connected to each other so as to be capable of moving relatively, a first image-capture unit and a first display unit that are provided in the first case, and a second image-capture unit and a second display unit that are provided in the second case. The display method includes: imaging a first image by the first image-capture unit; imaging a second image by the second image-capture unit; determining whether the first image and the second image include a face seen from front; causing the first display unit to display the first image and the second image when it is determined that the first image includes a face seen from front; and causing the second display unit to display the first image and the second image when it is determined that the second image includes a face seen from front.

A program according to an exemplary aspect of the present invention causes a display device including first and second cases that are connected to each other so as to be capable of moving relatively, a first image-capture unit and a first display unit that are provided in the first case, and a second image-capture unit and a second display unit that are provided in the second case, to execute: imaging a first image by the first image-capture unit; imaging a second image by the second image-capture unit; determining whether the first image and the second image include a face seen from front; causing the first display unit to display the first image and the second image when it is determined that the first image includes a face seen from front; and causing the second display unit to display the first image and the second image when it is determined that the second image includes a face seen from front.

Effect of the Invention

According to an exemplary embodiment of the present invention, it is possible to display in one screen the figure of the user seen from multiple different directions.

EMBODIMENTS FOR CARRYING OUT THE INVENTION

Figure 1:
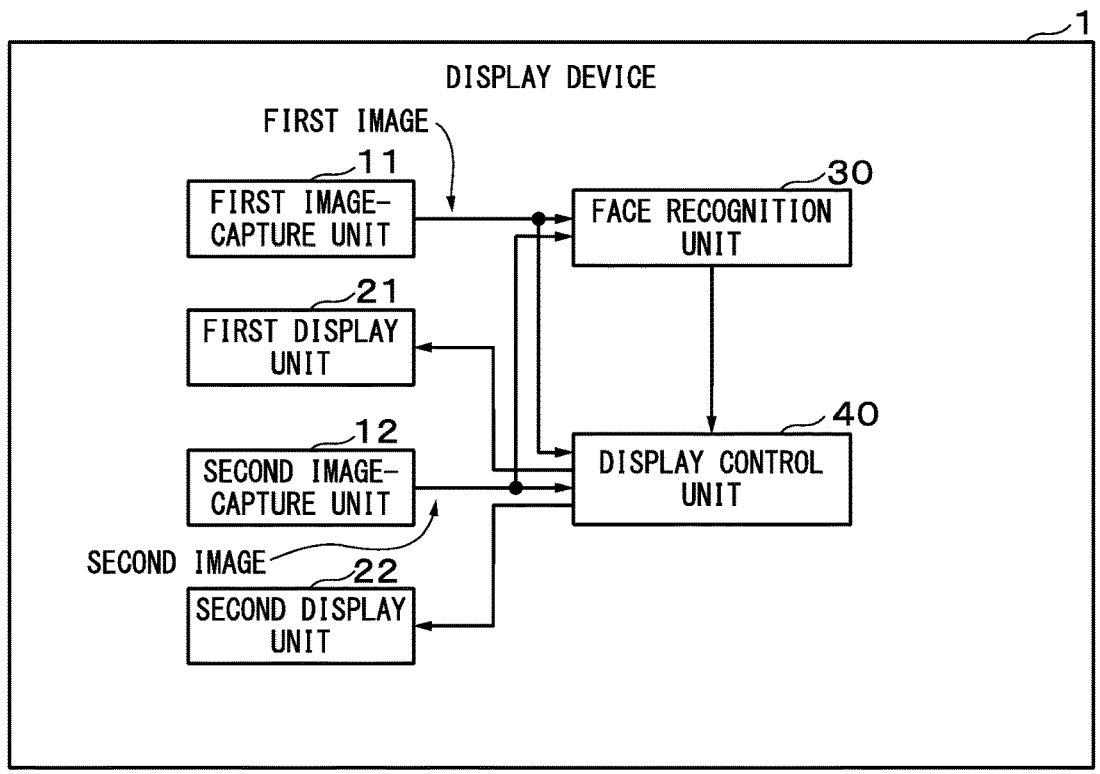
FIG. 1 is a block diagram that shows a display device according to an exemplary embodiment of the present invention.
Figure 2:
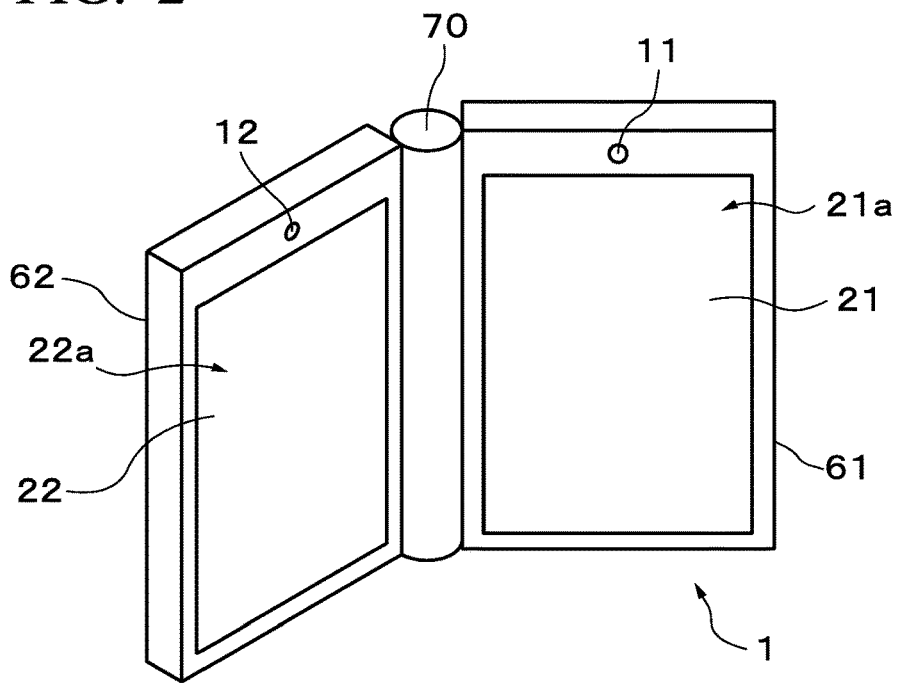
FIG. 2 is a perspective view that schematically shows the outward appearance of the display device shown in FIG. 1.
Figure 3:
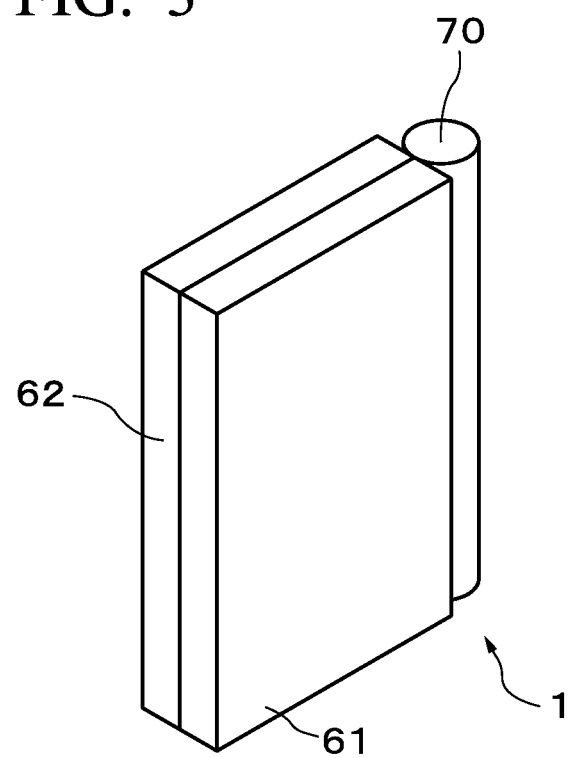
FIG. 3 is a perspective view that schematically shows the outward appearance of the display device shown in FIG. 1.

Hereinbelow, an exemplary embodiment of the present invention shall be described referring to the figures. FIG. 1 is a block diagram that shows a display device 1 according to the exemplary embodiment of the present invention. FIG. 2 and FIG. 3 are perspective views that schematically show the outward appearance of the display device 1. In the figures, the same constitutions are denoted by the same reference symbols.

The display device 1 shown in FIG. 1 includes a first image-capture unit 11, a first display unit 21, a second image-capture unit 12, a second display unit 22, a face recognition unit 30, and a display control unit 40.

The display device 1 also internally includes one or a plurality of central processing units (CPUs), memory, and an input/output interface circuit and the like that are not illustrated. The face recognition unit 30 and the display control unit 40 are constituted by the CPU executing predetermined programs.

Also, the display device 1 is provided with an input unit such as a touch panel that is integrally constituted with for example each of the first display unit 21 and the second display unit 22.

The first image-capture unit 11 has inside therein an optical system, an image-capture element, and a control circuit that performs driving of the image-capture element and signal conversion. The first image-capture unit 11 outputs a moving image or still image that has been captured (hereinbelow called a first image) as a predetermined image signal.

The first display unit 21 may for example be a liquid crystal display panel. The first display unit 21 displays a moving image or a still image based on the signal that the display control unit 40 has output.

The first image-capture unit 11 and the first display unit 21 may for example be provided in a first case 61 as shown in FIG. 2. A display surface 21a of the first display unit 21 is parallel with a surface that is perpendicular to the image-capture direction (that is, the optical axis direction) of the first image-capture unit 11. The first display unit 21 stops the display operation in the case of a predetermined display stop signal being input from the display control unit 40.

The second image-capture unit 12 has the same constitution as the first image-capture unit 11. That is, the second image-capture unit 12 has inside therein an optical system, an image-capture element, and a control circuit that performs driving of the image-capture element and signal conversion. The second image-capture unit 12 outputs a moving image or still image that has been captured (hereinbelow called a second image) as a predetermined image signal.

The second display unit 22 may for example be a liquid crystal display panel. The second display unit 22 displays a moving image or a still image based on the signal that the display control unit 40 has output.

The second image-capture unit 12 and the second display unit 22 may for example be provided in a second case 62 as shown in FIG. 2. A display surface 22a of the second display unit 22 is parallel with a surface that is perpendicular to the image-capture direction of the second image-capture unit 12. The second display unit 22 stops the display operation in the case of a predetermined display stop signal being input from the display control unit 40.

The face recognition unit 30 performs a predetermined face image recognition process on the first image based on the image signal that the first image-capture unit 11 has output. Also, the face recognition unit 30 performs a predetermined face image recognition process on the second image based on the image signal that the second image-capture unit 12 has output. This face recognition unit 30 determines whether or not a face seen from the front can be recognized in the first image or second image, that is, whether or not the first image or the second image includes a face seen from the front.

The methods of the face image recognition process and the face direction determination process are not particularly limited. As the method of the determination process, it can be performed using a generally known method. For example, the facial contour, eyes, nose, mouth or the like are recognized by comparing a plurality of patterns prepared in advance, and based on the relative position of the eyes, nose, mouth or the like in the contour, the direction of the face is recognized.

The face recognition unit 30 outputs an image signal that represents the first image and an image signal that represents the second image to the display control unit 40. Also, the face recognition unit 30 outputs the aforementioned determination result to the display control unit 40. The image signal that represents the first image and the image signal that represents the second image may also be input from the first image-capture unit 11 and the second image-capture unit 12 directly to the display control unit 40.

The display control unit 40, based on the first image and the second image that the first image-capture unit 11 and the second image-capture unit 12 have respectively picked up, controls the images displayed on the first display unit 21 and the second display unit 22.

The display control unit 40, in the case of the face recognition unit 30 having determined that the first image includes a face seen from the front, displays the first image and the second image on the first display unit 21. The display control unit 40, in the case of the face recognition unit 30 having determined that the second image includes a face seen from the front, displays the first image and the second image in the second display unit 22.

The case shall be described of the face recognition unit 30 having determined that the first image includes a face seen from the front. In this case, the display control unit 40 may generate an image signal that is input to the first display unit 21 such that the first image is arranged in the upper portion of the display region of the first display unit 21 (display surface 21a), and the second image is arranged in the lower portion of the display region of the first display unit 21.

The case shall be described of the face recognition unit 30 having determined that the second image includes a face seen from the front. In this case, the display control unit 40 may generate an image signal that is input to the second display unit 22 such that the second image is arranged in the upper portion of the display region of the second display unit 22 (display surface 22a), and the first image is arranged in the lower portion of the display region of the second display unit 22.

The display control unit 40, in the case of the face recognition unit 30 having determined that the first image includes a face seen from the front, stops the display on the second display unit 22.

The display control unit 40, in the case of the face recognition unit 30 having determined that the second image includes a face seen from the front, stops the display on the second display unit 22.

In stopping the display, the display control unit 40 may turn off the power of the first display unit 21 or the second display unit 22, or may display a completely black or completely white image on the first display unit 21 or the second display unit 22.

As shown in FIG. 2, the display device 1 has the first case 61, the second case 62, and a hinge 70. The first case 61 has the first image-capture unit 11 and the first display unit 21. The second case 62 has the second image-capture unit 12 and the second display unit 22. The hinge 70 connects in a freely turnable manner the first case 61 and the second case 62. That is, the first case 61 and the second case 62 are connected in a mutually movable manner.

As shown in FIG. 3, the rotation range of the hinge 70 may be set so as to be able to fold the first case 61 and the second case 62 such that the first display unit 21 and the second display unit 22 face each other. In the case of the first case 61 and the second case 62 being positioned as shown in FIG. 2, the optical axis of the first image-capture unit 11 and the optical axis of the second image-capture unit are not mutually parallel but intersect. That is, in the positional relation shown in FIG. 2, the optical axes of the first image-capture unit 11 and the second image-capture unit 12 can image the user seen from respectively different directions.

Figure 4:
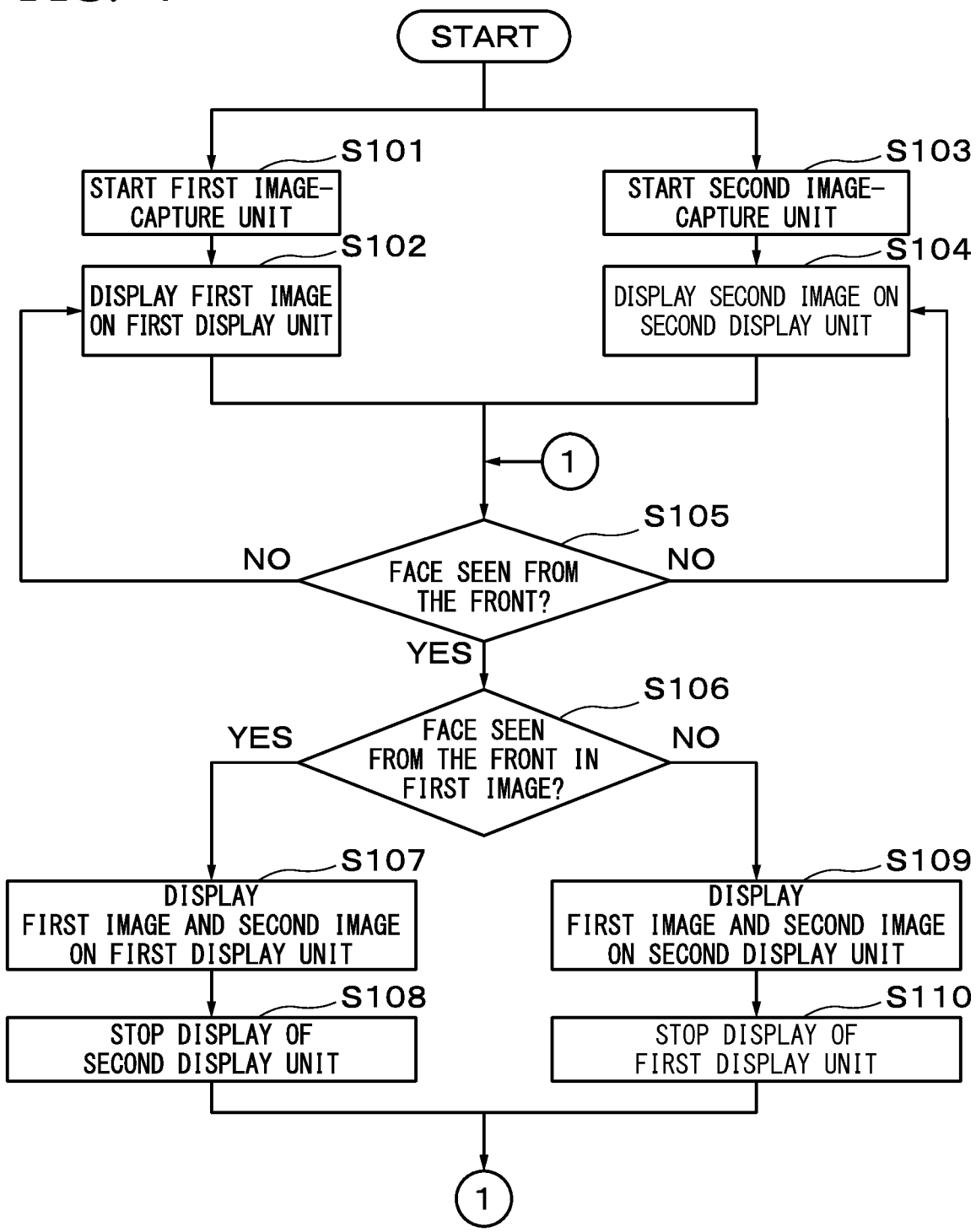
FIG. 4 is a flowchart for describing an operation example of the display device shown in FIG. 1.

Referring to FIG. 4, an operation example of the display device 1 shown in FIG. 1 shall be described. By executing a predetermined program by the internal CPU not shown in the display device 1, the units shown in FIG. 1 are controlled, whereby the processes shown in FIG. 4 are executed. The determination process shown in FIG. 4 may be executed in one-frame units, or may be executed in units of a predetermined plurality of frames (or predetermined time units).

The display device 1 executes the processes of steps S101, S102, S105 and the process of steps S103 to S105 described below in parallel.

(Step S101)

The first image-capture unit 11 is activated under CPU control. The first image-capture unit 11 captures a first image and outputs an image signal.

(Step S102)

The first display unit 21 displays the first image based on the image signal that is output from the first image-capture unit 11.

(Step S103)

Meanwhile, the second image-capture unit 12 is activated under CPU control. The second image-capture unit 12 captures a second image and outputs an image signal.

(Step S104)

The second display unit 22 displays the second image based on the image signal that is output from the second image-capture unit 12.

(Step S105)

The face recognition unit 30 determines whether or not the first image and the second image include a face seen from the front. In the case of the face recognition unit 30 having determined that the first image does not include a face seen from the front, the display control unit 40 returns to Step S102 and displays the first image in the first display unit 21. In the case of the face recognition unit 30 having determined that the first image does not include a face seen from the front, the display control unit 40 returns to Step S104 and displays the second image in the second display unit 22.

(Step S106)

The face recognition unit 30, in the case of having determined that the first image or the second image includes a face seen from the front, determines whether the image in which a face seen from the front is included is either of the first image and the second image.

(Step S107)

In the case of the face recognition unit 30 having determined that the first image includes a face seen from the front, the display control unit 40 displays the first image and the second image on the first display unit 21. For example, the display control unit 40 may perform an image process for displaying the captured image of the first image-capture unit 11 (first image) in the first display region of the first display unit 21, and for displaying the captured image of the second image-capture unit 12 (second image) in the second display region of the first display unit 21. The first display region of the first display unit 21 is for example a region 211 positioned in the upper-half portion of the first display unit 21 shown in FIG. 5. The second display region of the first display unit 21 is for example a region 212 positioned in the lower-half portion of the first display unit 21 shown in FIG. 5.

(Step S108)

The display control unit 40 stops the display on the second display unit 22.

(Step S109)

In the case of the face recognition unit 30 having determined that the second image includes a face seen from the front, the display control unit 40 displays the first image and the second image on the second display unit 22. For example, the display control unit 40 may perform an image process for displaying the captured image of the second image-capture unit 12 (second image) in the first display region of the second display unit 22 (for example, the display region in the upper portion), and for displaying the captured image of the first image-capture unit 11 (first image) in the second display region of the second display unit 22 (for example, the display region in the lower portion). The first display region of the second display unit 22 is for example a region 221 positioned in the upper-half portion of the second display unit 22 shown in FIG. 7. The second display region of the second display unit 22 is for example a region 222 positioned in the lower-half portion of the second display unit 22 shown in FIG. 7.

(Step S110)

The display control unit 40 stops the display on the second display unit 22.

By the above processes, the display device 1 can display the captured image of the first image-capture unit 11 (first image) and the captured image of the second image-capture unit 12 (second image) in the display screen of the first display unit 21 or the second display unit 22. That is, the display device 1 can display images of the user's face seen from different angles in a screen at the position the user is looking (field of view). Thereby, the user, by looking at one display screen, can confirm both the face seen from the front looking at that display screen and the face seen from a different angle. Even in the case of the constitution of the display device 1 according to the present exemplary embodiment being a tablet terminal or mobile terminal, it is possible to easily display the figure of the user seen from different angles in one display unit simultaneously.

Also, according to the aforementioned constitution, the user can see the display images of the first display unit 21 or the second display unit 22 without interposing a half mirror or reflecting them with a mirror. By performing viewing with images displayed in a display unit, it is possible to reduce the difference between the image quality of the face seen from the front and the image quality of the face seen from the side, and so they become easier to see.

Figure 5:
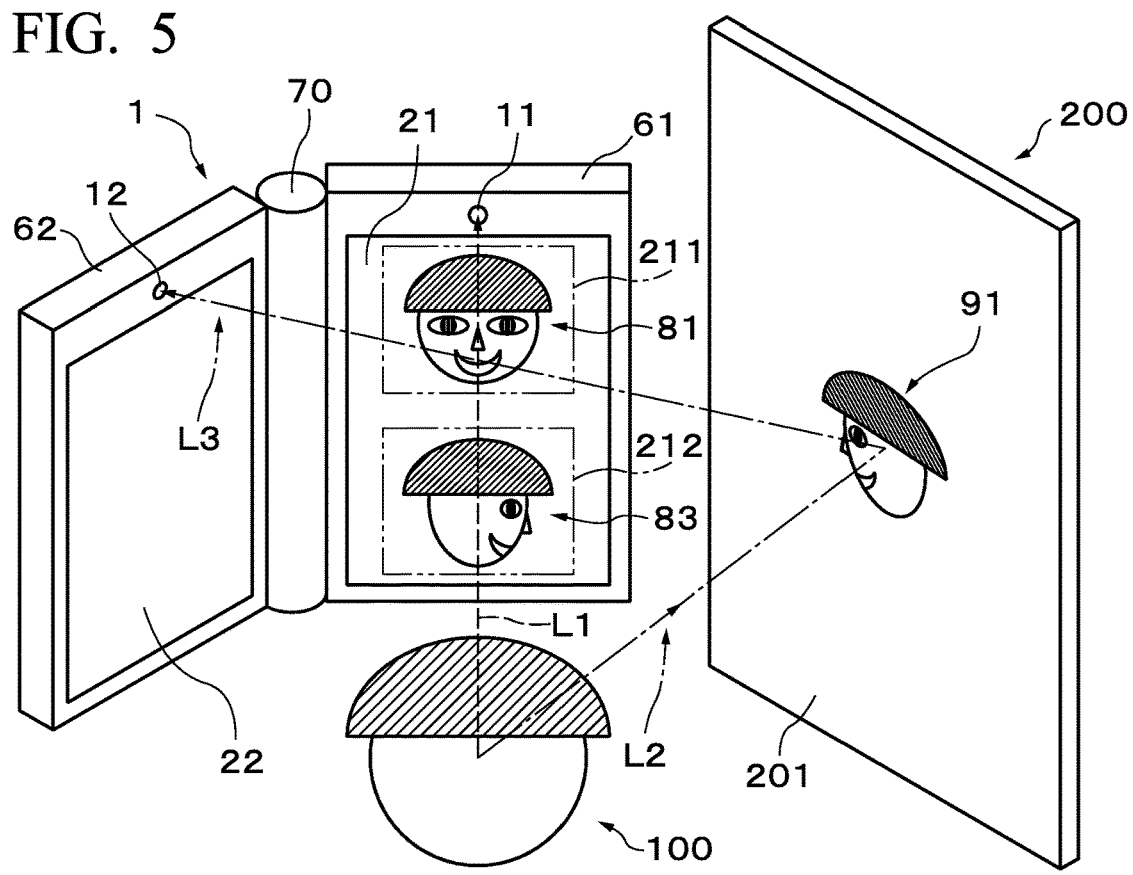
FIG. 5 is a view for describing a first operation example of the display device shown in FIG. 1.
Figure 6:
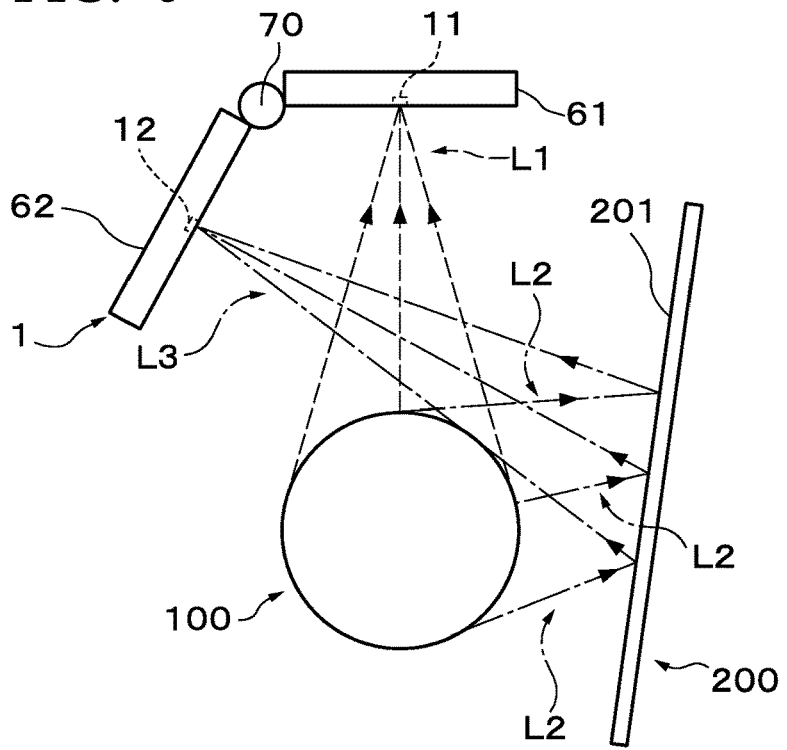
FIG. 6 is a schematic plan view for describing the first operational example.

A first operation example of the display device 1 that has been described referring to FIG. 1 to FIG. 3 shall be described referring to FIG. 5 and FIG. 6. FIG. 5 is a view for describing the first operation example of the display device 1. FIG. 6 is a schematic plan view for describing an example of the progress of light in the first operation example.

In the first operation example shown in FIG. 5 and FIG. 6, the display device 1 directly images the front of the face of a user 100 with the first image-capture unit 11 (that is, images the actual image), and images by the second image-capture unit 12 a mirror image 91 of a side of the face of the user 100 reflected onto a reflecting surface 201 of a mirror 200. In the first operation example, when the user starts this function, imaging is started by two of the image-capture unit 11 and the image-capture unit 12, and both captured images are displayed in the two display units 21 and 22.

The user 100 adjusts the angle of the hinge 70 while viewing the display of the display unit 21 or 22 so that the figure of himself seen from the front can be imaged by one image-capture unit (in this case, the first image-capture unit 11) and the profile or figure seen from the rear of himself reflected in the mirror 200 can be imaged by the other image-capture unit (in this case, the second image-capture unit 12).

Next, the display device 1 performs a face recognition process on the images that the two image-capture units 11 and 12 have imaged.

The display device 1 continues the display of the display unit (in this case, the first display unit 21) that is arranged in the same case (in this case, the first case 61) as the image-capture unit (in this case, the first image-capture unit 11) that has imaged the image in which a face seen from the front of the user 100 can be recognized (in this case, the first image).

Also, the display device 1 stops the display of the other display unit (in this case, the second display unit 22).

In this case, in the first operation example, the first image-capture unit 11 images the first image by receiving light L1 reflected by the front of the face of the user 100.

The second image-capture unit 12 images the second image by receiving light L3, which is light L2 reflected by the side of the face of the user 100 that is reflected by the reflecting surface 201.

In this case, since the face recognizing unit 30 recognizes a facial front image in the first image, a front image 81 of the face (that is, the first image) is displayed in the first display region 211 of the first display unit 21, and a side image 83 of the face (that is, the second image) is displayed in the first display region 212.

Also, the display operation of the second display unit 22 is stopped.

In the first operation example, the mirror image 91 of the side of the face of the user 100 that is reflected by the reflecting surface 201 is imaged by the second display unit 21. In this case, since it is also possible to adjust the angle of the mirror 200 in addition to adjustment of the angle of the case 61 and the case 62, it is possible to increase the degree of freedom of adjustment.

Figure 7:
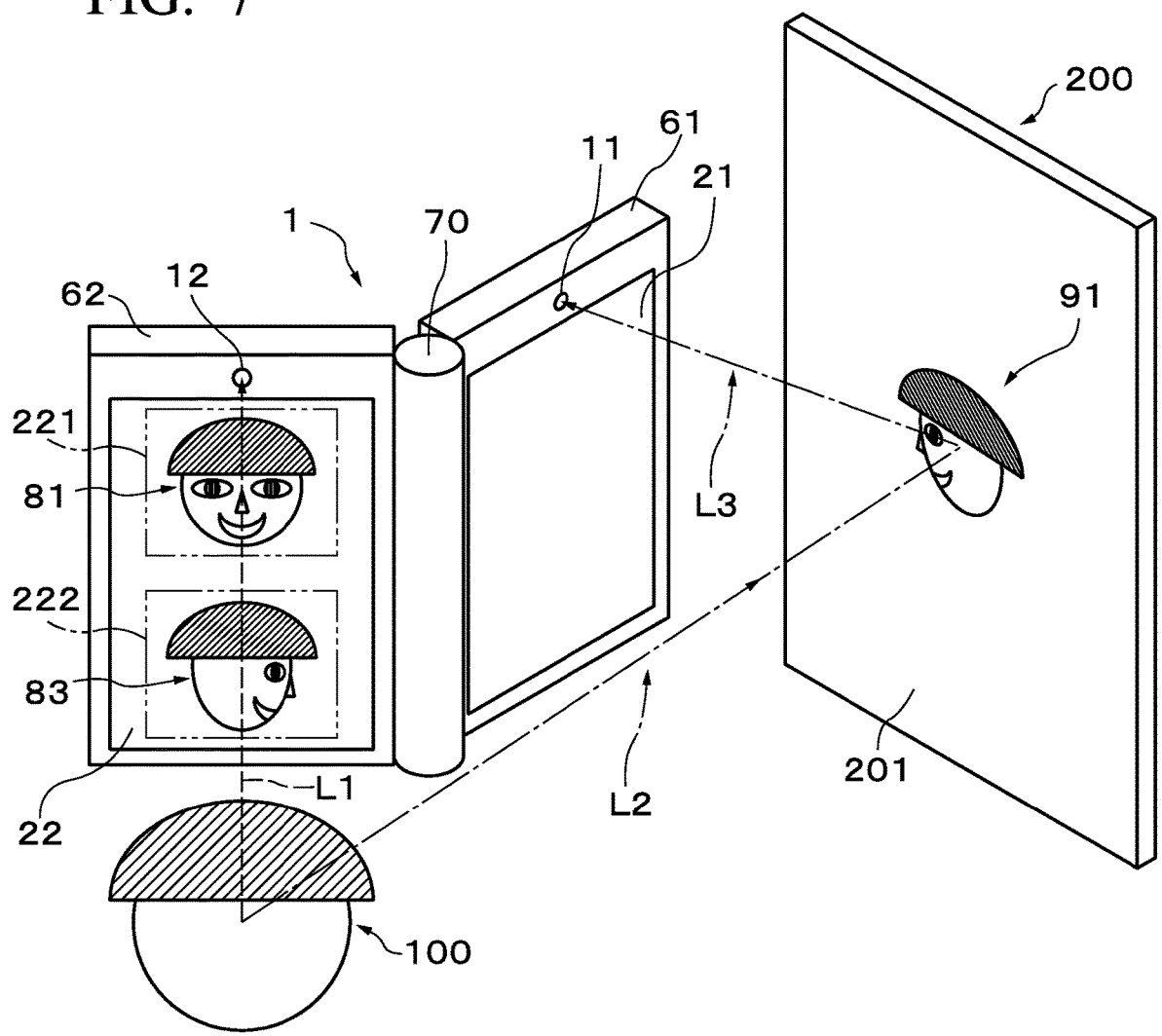
FIG. 7 is a view for describing a second operation example of the display device shown in FIG. 1.
Figure 8:
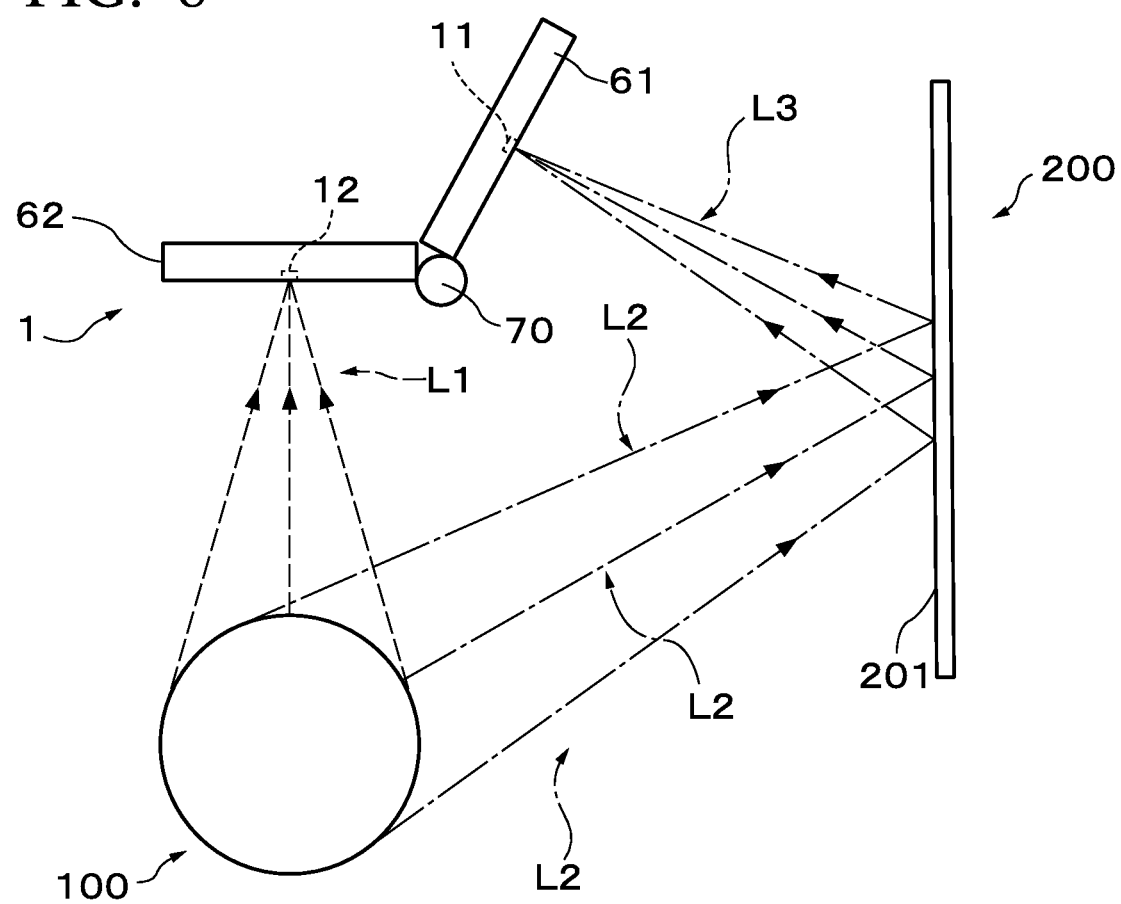
FIG. 8 is a schematic plan view for describing the second operational example.

Next, a second operation example of the display device 1 that has been described referring to FIG. 1 to FIG. 3 shall be described referring to FIG. 7 and FIG. 8. FIG. 7 is a view for describing the second operation example of the display device 1. FIG. 8 is a schematic plan view for describing an example of the progress of light in the second operation example.

In the second operation example shown in FIG. 7 and FIG. 8, the display device 1 directly images with the second image-capture unit 12 the front of the face of the user 100, and images with the first image-capture unit 11 the mirror image 91 of the side of the face of the user 100 that is reflected in the reflecting surface 201 of the mirror 200.

In the second operation example, the second image-capture unit 12 images the second image by receiving light L1 reflected by the front of the face of the user 100.

The first image-capture unit 11 images the first image by receiving light L3, which is light L2 reflected by the side of the face of the user 100 that is reflected by the reflecting surface 201.

In this case, since the face recognition unit 30 recognizes a facial front image in the second image, a front image 81 of the face (that is, the second image) is displayed in the first display region 221 of the second display unit 22, and a side image 83 of the face (that is, the first image) is displayed in the second display region 222. Also, the display operation of the first display unit 21 is stopped.

While the first case 61 is made to face the front of the user 100 in the first operation example, the second case 62 is made to face the front of the user 100 in the second operation example. Even in the second operation example, it is possible to display two captured images in a display unit facing the front of the user 100, in the same manner as the first operation example.

Figure 9:
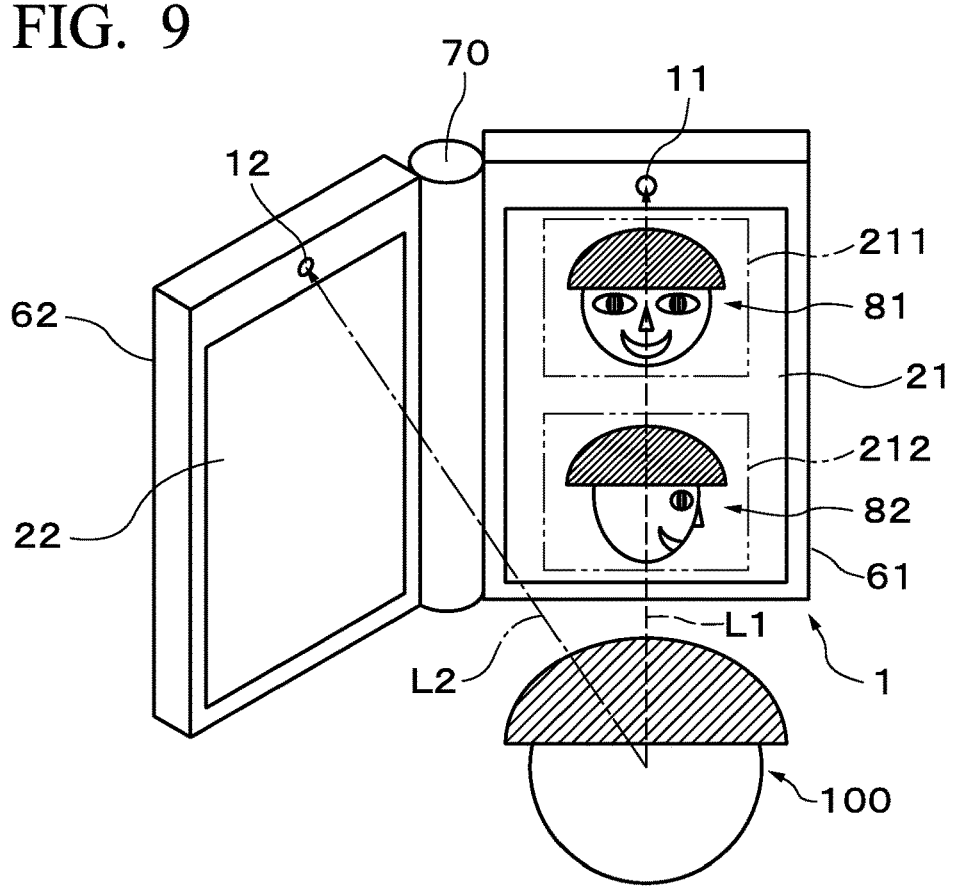
FIG. 9 is a view for describing a third operation example of the display device shown in FIG. 1.
Figure 10:
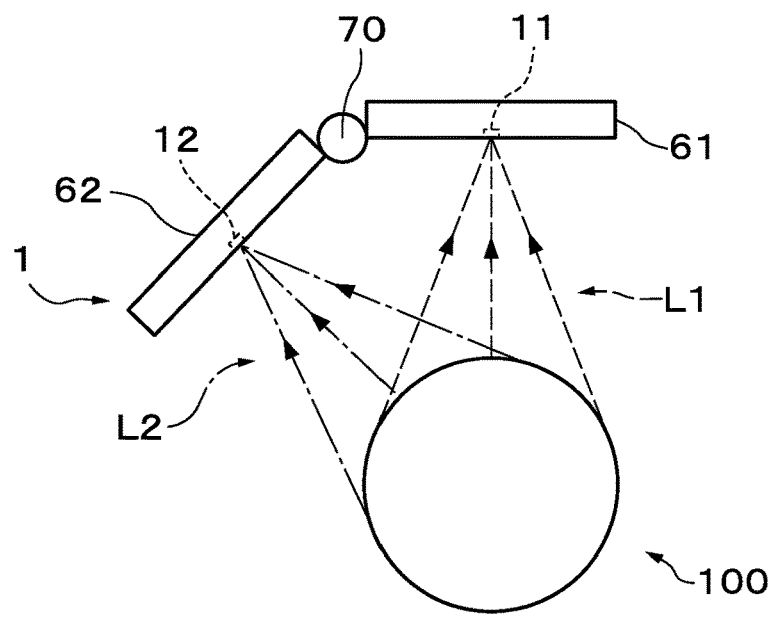
FIG. 10 is a schematic plan view for describing the third operational example.

Next, a third operation example of the display device 1 that has been described referring to FIG. 1 to FIG. 3 shall be described referring to FIG. 9 and FIG. 10. FIG. 9 is a view for describing the third operation example of the display device 1. FIG. 10 is a schematic plan view for describing an example of the progress of light in the third operation example.

In the third operation example shown in FIG. 9 and FIG. 10, the display device 1 directly images the front of the face of the user 100 with the first image-capture unit 11, and directly images a side of the face of the user 100 with the second image-capture unit 12. In the third operation example, the first-capture unit 11 images the first image by receiving light L1 reflected by the front of the face of the user 100. The second image-capture unit 12 images a second image by receiving light L2 reflected by the side of the face of the user 100. In this case, since the face recognition unit 30 recognizes a facial front image in the first image, a front image 81 of the face (that is, the first image) is displayed in the first display region 221 of the first display unit 12, and a side image 82 of the face (that is, the second image) is displayed in the second display region 222. Also, the display operation of the second display unit 22 is stopped.

In the third operation example, the image of the front of the user 100 and an image other than the front are imaged without using a mirror 200. In this case, the image other than the front of the user 100 cannot serve as the image of the figure of the complete side surface or close to the back surface, but it is possible to simultaneously display images of the front surface and other than the front surface without using the mirror 200.

As shown above, according to the present exemplary embodiment, it is possible to achieve the same functionality as a two-sided mirror or combination mirror or the like using the display device including a plurality of image-capture units and a plurality of display units. Also, it is possible to view the left and right sides of the face in a similar manner by a method of use that switches between the left and right. Also, by automatically stopping display of the display device not in use, it is possible to achieve a reduction in power consumption.

The exemplary embodiment of the present invention is not limited to that described above. For example, the positional relation of the image-capture unit and the display unit within the same case may be changed. Also, a change may be made so that, in the event of stopping the display operation, control is performed that stops the display in the case of a condition for stopping the display operation having continued for a specific time. The display device according to the exemplary embodiment of the present invention may also be constituted using a CPU and a program that the CPU executes. A portion or all of that program may be distributed via a computer-readable recording medium or communication lines.

According to the exemplary embodiment of the present invention, for example it is possible to display the figure of the user seen from two different directions by the first image-capture unit 11 and the second image-capture unit 12 on either one of the first display unit 21 and the second display unit 22. In doing so, in the case of the face of the user being recognizable, display is performed in either one of the first display unit 21 and the second display unit 22 that is in the front direction of the user, with the other display being stopped.

In that case, it is possible for the user to directly view the display images of the first display unit 21 and the second display unit 22 without using a mirror or the like. Thereby, it is possible to easily achieve a reduction in power consumption.

The display device according to the present exemplary embodiment may internally have a computer system. The process of operation may be stored in a computer-readable recording medium in the form of a program, and by a computer system reading this program and executing it, the aforementioned processes may be performed. The "computer system" here includes a CPU, various types of memory, an OS and hardware such as peripheral devices.

The "computer system" in the case of using a WWW system also includes a homepage providing environment (or display environment).

By recording a program for realizing each step on a computer-readable recording medium, or by recording a program for realizing this function in computer-readable recording medium, the program that is stored in this recording medium may be read into a computer system and executed.

The "computer-readable recording medium" includes writable non-volatile memory such as a magnetic disk, ROM and flash memory, portable media such as a CD-ROM, and a storage device such as a hard disk that is housed in a computer system.

The "computer-readable recording medium" also includes one that retains the program for a given period of time, such as volatile memory (for example DRAM (Dynamic Random Access Memory)) in a computer system that functions as a server or client in the case of the program being transmitted via a network such as the Internet or a communication line such as a telephone line.

The aforementioned program may be transmitted from a computer system having this program stored in a storage device thereof to another computer system via a transmission media or by transmission waves in the transmission media. The term "transmission media" that transmits the program includes a media having a function for transferring information, such as a network (communication network) such as the Internet, or a communication line (communication cable) such as a telephone line.

Moreover, the program may be for realizing a part of the aforementioned functions.

Furthermore, it may be a so-called differential file (differential program), whereby the functions described above can be realized by a combination with programs that are already recorded in the computer system.

The present invention has been described above referring to the exemplary embodiment, but the present invention is not limited to this exemplary embodiment. Various changes that could be understood by a person skilled in the art can be made to the structures and details of the present invention within the scope of the present invention.

This application is based upon and claims the benefit of priority from Japanese patent application No. 2013-066752, filed on Mar. 27, 2013, the disclosure of which is incorporated herein in its entirety by reference.

INDUSTRIAL APPLICABILITY

The present invention may be applied to a display device, a display method, and a display program.

REFERENCE SYMBOLS

1 Display device
11 First image-capture unit
12 Second image-capture unit
21 First display unit
22 Second display unit
30 Face recognition unit
40 Display control unit
61 First case
62 Second case
70 Hinge
200 Mirror
201 Reflecting surface

What is claimed is:
1. A display device comprising:
a first case and a second case, the first and second cases being connected to each other so as to be capable of moving relative to each other;
a first image-capture unit that is provided in the first case and images a first image;
a second image-capture unit that is provided in the second case and images a second image;
a first display that is provided in the first case;
a second display that is provided in the second case; and
a central processing unit that determines whether the first image or the second image includes a face of a user seen from a front; wherein
the central processing unit causes the first image and the second image to be displayed on either the first display or the second display that is respectively provided in the respective first and second cases with the respective first image-capture unit and the second image-capture unit that captured an image determined to include the face of the user seen from the front, when it is determined that either the first image or the second image includes the face of the user seen from the front, and causes the first image and the second image to be displayed on the first display and the second display, respectively, when it is determined that neither the first image nor the second image includes the face of the user seen from the front.

2. The display device according to claim 1,
wherein the first display has the first display surface perpendicular to the optical axis direction of the first image-capture unit, and
the second display has the second display surface perpendicular to the optical axis direction of the second image-capture unit.

3. A display method for a display device including a first case and a second case, the first and second cases being connected to each other so as to be capable of moving relative to each other, the method comprising:
   imaging, by a first image-capture unit that is provided in the first case together with a first display, a first image;
   imaging, by a second image-capture unit, that is provided in the second case together with a second display, a second image;
   determining whether the first image or the second image includes a face of a user seen from a front; and
   causing the first image and the second image to be displayed on either the first display or the second display that is respectively provided in the respective first and second cases with the respective first image-capture unit and the second image-capture unit that captured an image determined to include the face of the user seen from the front when it is determined that either the first image or the second image includes the face seen from the front, and causing the first image and the second image to be displayed on the first display and the second display, respectively, when it is determined that neither the first image nor the second image includes the face of the user seen from the front.

4. A non-transitory computer-readable recording medium storing a program that causes a display device, including a first case and a second case, the first and second cases being connected to each other so as to be capable of moving relative to each other, to execute:
   causing a first image-capture unit that is provided in the first case, together with a first display, to image a first image;
   causing a second image-capture unit that is provided in the second case, together with a second display, to image a second image;
   determining whether the first image or the second image includes a face of a user seen from a front; and
   causing the first image and the second image to be displayed on either the first display or the second display that is respectively provided in the respective first and second cases with the respective first image-capture unit and the second image-capture unit that captured an image determined to include the face of the user seen from the front, when it is determined that either the first image or the second image includes the face of the user seen from the front, and causing the first image and the second image to be displayed on the first display and the second display, respectively, when it is determined that neither the first image nor the second image includes the face of the user seen from the front.

* * * * *